W. BARTHOLOMEW.
BEARING FOR CENTRIFUGAL EXTRACTORS.
APPLICATION FILED DEC. 10, 1917.

1,301,356.   Patented Apr. 22, 1919.

Witnesses:

Inventor
William Bartholomew
By Wilkinson & Huxley
Attys

UNITED STATES PATENT OFFICE.

WILLIAM BARTHOLOMEW, OF CHICAGO, ILLINOIS, ASSIGNOR TO TROY LAUNDRY MACHINERY CO., LTD., OF CHICAGO, ILLINOIS, A CORPORATION OF NEW YORK.

BEARING FOR CENTRIFUGAL EXTRACTORS.

1,301,356.  Specification of Letters Patent.  Patented Apr. 22, 1919.

Application filed December 10, 1917. Serial No. 206,527.

*To all whom it may concern:*

Be it known that I, WILLIAM BARTHOLOMEW, a citizen of the United States, and resident of Chicago, in the county of Cook and State of Illinois, have invented certain new and useful Improvements in Bearings for Centrifugal Extractors, of which the following is a specification.

My invention relates to centrifugal extractors, and has particular reference to spindle bearing mechanism therefor.

One of the objects of the invention is to maintain a relatively low bearing temperature.

Another object is to absorb gyratory motion of the spindle in a novel manner, the arrangement of the bearing members being such that the spindle is held securely, yet the arrangement of the parts is such that the gyratory motion of the spindle is taken up and the bearing parts maintained at a relatively low temperature.

A further object of the invention is to provide bearings, the members of which are out of contact with each other as much as possible thereby allowing for the circulation of air between such parts.

These and other objects are accomplished by providing in a centrifugal extractor, the combination of a spindle, a bearing bushing therefor having a laterally extending flange, and bearing members operatively connected with the laterally extending flange to take up gyratory motion, the said members being spaced apart from said bushing to allow a free circulation of air between said bushing and bearing members.

The invention is illustrated on the accompanying sheet of drawing in which.

Figure 1:
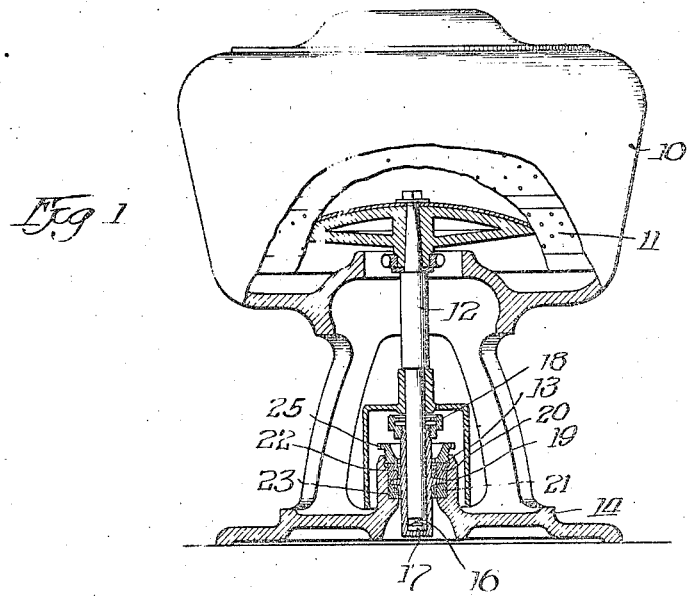
Figure 1 is a side elevation, parts being in section, of a centrifugal extractor embodying my invention.
Figure 2:
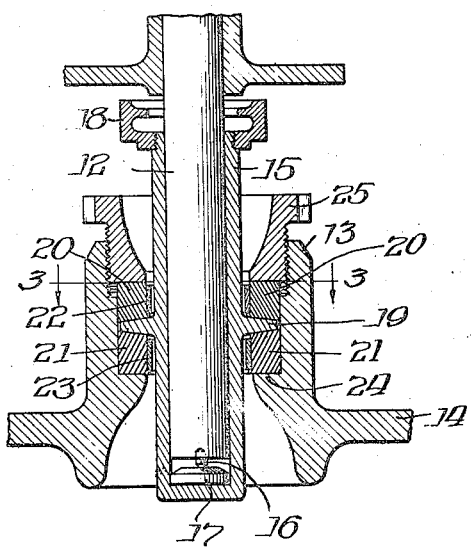
Fig. 2 is an enlarged detail sectional view of a spindle bearing mechanism.
Figure 3:
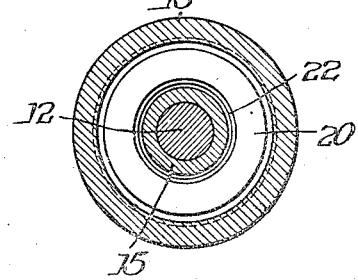
Fig. 3 is a sectional view taken in the plane of line 3—3 of Fig. 2.

Referring more specifically to the drawings, and in which like reference characters refer to like parts throughout, 10 is a centrifugal hydro extractor having a perforated basket 11 secured to the upper end of a spindle 12, the lower end of which is mounted within a recessed portion 13 formed in the base 14 of the curb. The lower end of the spindle 12 rotates in a bearing bushing 15 and is provided with any suitable stepped bearing 16 having a curved surface rotating upon a stationary step 17 located in the bottom closed end of the bushing 15. The top of the bushing is provided with any suitable oiling device 18 and intermediate the ends of the bushing it has an integrally formed laterally extending flange 19, the upper and lower sides of which converge outwardly. Engaging the upper surface of said flange is an annular bearing member 20 and engaging the lower surface of said flange is a similar annular member 21. The annular members 20 and 21 are composed of an elastic material, such as rubber or the like. A pair of annular members 22 and 23 whose inside diameters are slightly larger than the outside diameter of the bushing 15, are inserted between the bearing members 20 and 21 and the bushing 15 and thus serve to space apart the bearing members 20 and 21 from engagement with the vertical portion of the bushing 15 immediately adjacent the location of the bearing members 20 and 21, thus allowing for a free circulation of air between the bearing members 20 and 21 and the bushing 15. Each of the bearing members 20 and 21 has a slight projection on its inside bottom portion upon which the rings or annular members 21 and 23 rest, thus preventing the members 22 from dropping down into engagement with the laterally extending flange 19 and the projection upon the member 21 preventing the annular member 23 from dropping out of position. The bearing member 21 rests upon an annular shoulder portion of the recessed portion 13 and is thus securely held in position. A lock nut 25 having threaded engagement with the upper portion of the recessed portion 13 holds the member 20 in a predetermined frictional engagement with the upper surface of the laterally extending flange 19 of the bushing 15, the lower side of said flange resting upon the bearing member 21. The tightening of the lock nut 25 therefore has the effect of clamping the laterally extending flange 19 between the bearing members 20 and 21 to take up any wear which may occur in the parts.

It will thus be seen that this bearing is comparatively simple, composed of few parts, and is so arranged that gyratory motion of the spindle will be taken up by the bearing members 20 and 21 and that sufficient pressure may be maintained upon these members through the action of the lock nut 25 to maintain a predetermined amount of pressure upon the laterally extending flange 19 of the bushing 15 at all times to hold the spindle 12 in a vertical position.

It is obvious that there may be various modifications of the arrangement herein particularly shown and described and it is my intention to cover all such modifications which do not depart from the spirit and scope of the invention as set forth in the following claims.

I claim:

1. In a centrifugal extractor, a spindle bearing bushing having a laterally extending flange, a pair of bearing members engaging the said flange on its opposite sides, and means engaging one side only of the bearing members for spacing the latter apart from said bushing.

2. In a centrifugal extractor, a spindle bearing bushing having a laterally extending flange, a pair of bearing members engaging the said flange on its opposite sides, and a pair of annular members adapted to space the said bearing members apart from said bushing, the said bearing members having projections at their lower edges for retaining the said spacing members in position.

3. In a centrifugal extractor, a spindle bearing bushing having a laterally extending flange, a pair of bearing members engaging the said flange on its opposite sides, and a pair of annular retaining members engaging the bearing members on their sides immediately adjacent the spindle bearing bushing whereby the bearing members are spaced apart from said bushing.

4. In a centrifugal extractor, a spindle bearing bushing having a laterally extending flange, a pair of elastic bearing members engaging said flange on its opposite sides, and means engaging one side only of the bearing members for spacing the latter apart from said bushing.

5. In a centrifugal extractor, a spindle bearing bushing having a laterally extending flange, a pair of bearing members engaging the said flange on its opposite sides, and a pair of annular retaining members having an inside diameter larger than the outside diameter of said bearing bushing interposed between the bearing bushing and the bearing members.

6. In a centrifugal extractor, a spindle bearing bushing having a laterally extending flange, a pair of bearing members engaging the said flange on its opposite sides, and a pair of annular members around said bushing whose diameters are larger than the outside diameter of the bushing and positioned above and below the laterally extending flange whereby the said bearing members are spaced apart from said bushing.

Signed at Chicago, Illinois, this 28th day of November, A. D. 1917.

WILLIAM BARTHOLOMEW.

Witness:

J. W. GRIFFEN.